United States Patent [19]

Chen et al.

[11] Patent Number: 5,445,758
[45] Date of Patent: Aug. 29, 1995

[54] COPOLYMERS OF ETHYLENICALLY UNSATURATED AND POLYETHYLENE-GLYCOL MONOMETHACRYLATE MONOMERIC REPEAT UNITS USEFUL AS SCALE CONTROL AGENTS IN BOILER SYSTEMS

[75] Inventors: Fu Chen, Newtown; Keith A. Bair, Horsham, both of Pa.; Scott M. Boyette, Wilmington, Del.

[73] Assignee: Betz Laboratories, Inc., Trevose, Pa.

[21] Appl. No.: 255,217

[22] Filed: Jun. 7, 1994

Related U.S. Application Data

[60] Continuation of Ser. No. 53,579, Apr. 27, 1993, Pat. No. 5,350,536, which is a division of Ser. No. 832,547, Feb. 7, 1992, Pat. No. 5,242,599.

[51] Int. Cl.⁶ .............................................. C02F 5/10
[52] U.S. Cl. ...................................... 252/180; 252/82; 210/698
[58] Field of Search .................... 252/180, 181, 82; 210/696, 697, 698

[56] References Cited

U.S. PATENT DOCUMENTS

| | | | |
|---|---|---|---|
| 4,326,980 | 4/1982 | Snyder et al. | 252/180 |
| 4,443,340 | 4/1984 | May et al. | 252/181 |
| 4,457,847 | 7/1984 | Lorenc et al. | 210/698 |
| 4,659,482 | 4/1987 | Chen | 252/181 |
| 4,828,713 | 5/1989 | McDonald et al. | 210/697 |
| 5,124,046 | 6/1992 | Sherwood et al. | 252/180 |
| 5,242,599 | 9/1993 | Chen et al. | 210/697 |
| 5,259,985 | 11/1993 | Nakanishi et al. | 252/180 |
| 5,350,536 | 9/1994 | Chen et al. | 252/180 |

*Primary Examiner*—Prince Willis, Jr.
*Assistant Examiner*—James M. Silbermann
*Attorney, Agent, or Firm*—Alexander D. Ricci; Richard A. Paikoff

[57] ABSTRACT

A composition for controlling the deposition of scale imparting species on the structural surfaces of steam generating systems comprising the use of a water soluble polymer having the structure

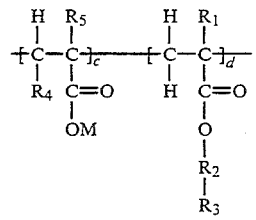

wherein $R_1$ is H or lower ($C_1$-$C_4$) alkyl, $R_2$ is $(CH_2-CH_2-O)_n$,

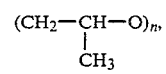

or a mixture of both, and n is an integer of from about 1 to about 40, $R_3$ is H, lower ($C_1$-$C_4$) alkyl or an acetate. This polymer may also be used in concert with topping agents such as phosphoric acids, phosphonic acids, amines, metal chelating agents and oxygen scavengers.

3 Claims, No Drawings

COPOLYMERS OF ETHYLENICALLY UNSATURATED AND POLYETHYLENE-GLYCOL MONOMETHACRYLATE MONOMERIC REPEAT UNITS USEFUL AS SCALE CONTROL AGENTS IN BOILER SYSTEMS

This is a continuation of application Ser. No. 08/053,579, filed Apr. 27, 1993, now U.S. Pat. No. 5,350,536 which is a divisional of application Ser No. 07/832,547, filed Feb. 7, 1992, now U.S. Pat. No. 5,242,599.

FIELD OF THE INVENTION

The present invention pertains to a method of utilizing novel polymers to control the formation and deposition of scale imparting compounds in steam generating systems such as boiler water systems.

BACKGROUND OF THE INVENTION

As detailed in the Betz Handbook of Industrial Water Conditioning, 8th Edition, 1980, Betz Laboratories, Inc., Trevose, Pa., Pages 85-96, the formation of scale and sludge deposits on boiler heating surfaces is a serious problem encountered in steam generation. Although current industrial steam producing systems make use of sophisticated external treatments of the boiler feedwater, e.g., coagulation, filtration, softening of water prior to its feed into the boiler system, these operations are only moderately effective. In all cases, external treatment does not in itself provide adequate treatment since muds, sludge, silts and hardness-imparting ions escape the treatment, and eventually are introduced into the steam generating system.

In addition to the problems caused by mud, sludge or silts, the industry has also had to contend with boiler scale. Although external treatment is utilized specifically in an attempt to remove calcium and magnesium from the feedwater, there is always a potential for scale formation due to residual hardness, i.e., calcium and magnesium salts. Accordingly, internal treatment, i.e., treatment of the water fed to the system, is necessary to prevent, reduce and/or retard formation of the scale imparting compounds and their resultant deposition. The carbonates of magnesium and calcium are not the only problem compounds as regards scale, but also water having high contents of phosphate, sulfate and silicate ions either occurring naturally or added for other purposes cause problems since calcium and magnesium and any iron or copper present, react with each and deposit as boiler scale. As is obvious, the deposition of scale on the structural parts of a steam generating system causes poorer circulation and lower heat transfer capacity, resulting accordingly in an overall loss of efficiency.

SUMMARY OF THE INVENTION

It has been discovered that certain water soluble copolymers, as shown in Formula I hereinafter, are effective in controlling the formation of mineral deposits and in transporting and removing hardness found in steam generating systems such as boiler water systems.

The water soluble copolymers of the invention have the structure:

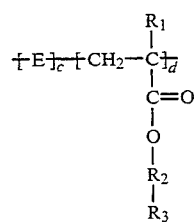

FORMULA I wherein E is the repeat unit remaining after polymerization of an alpha, beta ethylenically unsaturated compound, $R_1$ is H or lower ($C_1$–$C_4$) alkyl, $R_2$ is $(CH_2-CH_2-O)_n$,

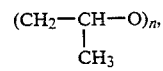

or a mixture of both, n is an integer of from about 1 to about 40, $R_3$ is hydrogen, lower ($C_1$–$C_4$) alkyl, or an acetate formed as a cap on the polyethyleneglycol methacrylate by reacting an acetylating agent with polyethyleneglycol methacrylate to produce an acetate capped polyethyleneglycol methacrylate which is then reacted with the alpha, beta ethylenically unsaturated compound E to form the copolymer of Formula I, c is the molar percentage being between 0-95 molar %, d is the molar percentage being between 100-5 molar %, c and d should add up to 100%.

RELATED ART

U.S. Pat. Nos. 4,326,980 and 4,828,713 disclose the utility of using a polymeric dispersant with a surfactant like molecule in steam generating applications. The combination of these two species provides increased deposit control activities in chelant/polymer and polymer/phosphate programs. However, experimental data showed that in a coordinated phosphate/pH program or an all polymer program, there was no superior performance benefit from a polymer plus surfactant approach.

U.S. Pat. No. 4,457,847 to Lorenc et al discloses a method of treating hardness in boiler waters by using a water-soluble anionic vinyl polymer containing at least 30 weight percent of carboxylate functionality and with a chelation value of at least 200. The present invention differs from the '847 patent by using a novel copolymer containing a new comonomer, polyethyleneglycol (meth)acrylate, low carboxylate content and with a chelation value less than 200. None of these traits is suggested in the '847 patent.

Chemical Abstracts 111:200688c, 97:133338r, 111:59631v, 109:96974p and 109:133509p teach using acrylic acid/polyethyleneglycol monomethacrylate copolymers for concrete, reverse osmosis and cooling scale inhibition applications.

Chemical Abstract 99:736026 discloses injecting polyethyleneglycol methacrylate, ammonium persulfate solution and triethanolamine into petroleum wells to prevent fire.

The monomer, polyethyleneglycol methacrylate, has been used in emulsion polymerization to improve the mechanical and freeze thaw stabilities of latex particles.

The use of the copolymers of this invention for boiler water treatment is not disclosed in the prior art.

DETAILED DESCRIPTION OF THE PREFERRED EMBODIMENTS

In accordance with the invention, it has been discovered that certain water soluble copolymers, as shown in Formula I hereinafter, are effective in controlling the formation of mineral deposits and in transporting and removing hardness ions found in steam generating systems such as boiler water systems.

The water soluble copolymers of the invention have the structure:

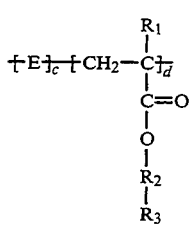

where E of Formula I comprises the repeat unit obtained after polymerization of an alpha, beta ethylenically unsaturated monomer, preferably a carboxylic acid, amide form thereof, or lower alkyl ($C_1$-$C_6$) ester or hydroxylated lower alkyl ($C_1$-$C_5$) ester of such carboxylic acids. Exemplary compounds encompassed by E include, but are not restricted to, the repeat unit formed by polymerization of acrylic acid, methacrylic acid, acrylamide, maleic acid or anhydride, fumaric acid, itaconic acid, 2-hydroxypropyl acrylate, styrene sulfonic acid, and 2-acrylamido-2-methylpropanesulfonic acid and the like. Water soluble salt forms of these acids are also within the purview of the invention.

$R_1$ in Formula I is H or lower ($C_1$-$C_4$) alkyl, $R_2$ is ($CH_2$-$CH_2$-O)$_n$,

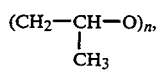

or mixture of both, n is an integer of from about 1 to about 40, $R_3$ is hydrogen, lower ($C_1$-$C_4$) alkyl, or an acetate formed as a cap on the polyethyleneglycol moiety by reacting an acetylating agent with a (meth)acrylate of polyethyleneglycol to produce an acetate capped polyethyleneglycol (meth)acrylate which is then reacted with the alpha, beta ethylenically unsaturated compound E to form the copolymer of Formula I. Suitable acetylating agents include acetic acid, acetic anhydride, acetyl chloride, and the like as described in U.S. Pat. Nos. 4,959,156 and 4,847,410 fully incorporated herein by reference. c is the molar percentage being between 0-95 molar %, d is the molar percentage being between 100-5 molar %, c and d should add to 100%.

A preferred copolymer of the present invention includes acrylic acid, methacrylic acid or maleic acid/-polyethyleneglycol monomethacrylate copolymers of the general formula:

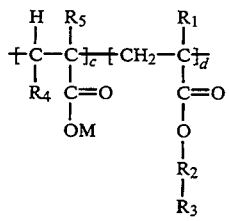

wherein $R_1$ is H or lower ($C_1$-$C_4$) alkyl, $R_2$ is ($CH_2$-$CH_2$-O)$_n$,

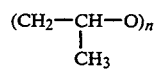

or mixture of both, n is an integer of from 1 to about 40, $R_3$ is H, lower (C1-C4) alkyl or an acetate, $R_4$ is H or COOM, $R_5$ is H or ($C_1$-$C_4$) alkyl and M is H or a water soluble cation, c is the molar percentage being between 0-95 molar %, d is the molar percentage being between 100-5 molar %, c and d should add up to 100%. Acrylic acid ($R_4$=H, $R_5$=H) or methacrylic acid ($R_4$=H, $R_5$=$CH_3$) may be replaced with maleic acid ($R_4$=COOH, $R_5$=H) in Formula II.

A homopolymer of polyethyleneglycol monomethacrylate is within the scope of the present invention.

The number average molecular weight of the water soluble or water dispersible copolymers of Formulas I or II is not critical and may fall within the Mn range of about 1,000 to 100,000 desirably, 1,000 to 30,000 and more desirably 1,500 to 10,000. The key criteria is that the copolymer be water soluble or water dispersible. Water soluble or water dispersible terpolymers comprising monomer c and d of Formula I may also be effective for use in the present invention. Also, minor amounts of additional monomers may be added to the polymers.

Polyethyleneglycol monomethacrylate (HEM) is prepared by ethoxylation of methacrylate esters. These compounds are commercially available from Rhone-Poulenc under the SIPOMER[R] Trademark. The monomers are then copolymerized with methacrylic acid or maleic acid to obtain the copolymers of the invention. Polyethyleneglycol monomethacrylate may also be polymerized to form a homopolymer. The polymerization may proceed in accordance with conventional solution, precipitation or emulsion polymerization techniques. Conventional polymerization initiators such as azo compounds, persulfates, peroxides, UV light, etc., may be used. Chain transfer agents such as alcohols (preferably isopropanol), amine or mercapto compounds may be used to regulate the molecular weight of the polymer. The resulting polymer may be isolated by well known techniques including precipitation, etc. If polymerized in water, the polymer may simply be used in its aqueous solution.

The polymers should be added to the boiler aqueous system, for which corrosion inhibiting, and/or deposit control activity is desired, in an amount effective for the purpose. This amount will vary depending upon the particular system for which treatment is desired and will be influenced by factors such as, the area subject to corrosion, pH, temperature, water quantity and the respective concentrations in the water of the potential scale and deposit forming species. For the most part, the polymers will be effective when used at levels of about 0.1–500 parts per million parts of water. The polymers may be added directly into the desired water system in a fixed quantity and in the state of an aqueous solution, continuously or intermittently.

The polymers of the present invention provide superior deposit control in several boiler treatment programs including coordinated phosphate/pH, chelant/polymer, and notably, all polymer programs. The polymers also increase iron and hardness transport in the all polymer program.

In addition to superior deposit control performance, these polymers provide several application advantages that make them superior additives for steam generating systems. The advantages circumvent problems with formulation difficulties, increased boiler solids, and feedwater train corrosion problems. A description of each of these additional advantages is as follows.

First, although proven viable, the conventional polymer plus surfactant treatment as disclosed in U.S. Pat. No. 4,828,713 has problems with the formulation of concentrated solutions. The high concentrations of polymer and surfactant needed for product storage are also not possible. In contrast the new polymers provide a single water soluble component. In addition, neutralized acrylate and methacrylate polymers present formulatory problems when adding phosphate salts to the final product. The new polymers eliminate, or greatly reduce this problem.

Second, a current all polymer program using poly sodium (meth)acrylate as disclosed in U.S. Pat. No. 4,457,847 contains notable concentrations of neutralizing inorganics that can result in increased total boiler solids, affect pH control in high purity systems, and affect conductivity monitoring in the blowdown. There have been several attempts to produce polymers neutralized with amines, but formulatory and expense problems made this impossible. The polymers of the invention eliminate or greatly reduce any additional neutralizing inorganics that can cause increased dissolved solids. They provide the first true all polymer additive and significantly reduce the deleterious effects of additional salts.

Third, it has been shown that compounds having a large lower temperature chelating strength have the potential for corroding feedwater trains prior to reaching the operating pressures of boilers (NACE 1991, paper #218). Most chelants and commercial anionic polymers have chelation values (the milligrams of hardness sequestered per gram of sequestrant or active polymer) greater than 200 (U.S. Pat. No. 4,457,847).

These same high chelation value compounds are suspected of having corrosion potential in feedwater heaters where the buffering strength is weak compared to cycled steam generating conditions. Under feedwater conditions the higher chelating species has the opportunity to sequester metals from the metallurgy of the feedwater train. The polymers of the invention have chelation values substantially lower than those anionic polymers cited in U.S. Pat. No. 4,457,847 and have minimal potential for feedwater train corrosion.

The use of the polymers disclosed herein is not limited to steam generating or boiler systems, exclusively. For instance, they may be successfully utilized in cooling water systems, gas scrubbing systems and the like where the formation and deposition of scale forming species is a problem.

The water soluble polymers of the present invention can also be used with topping agent components in order to enhance the corrosion inhibition and scale controlling properties thereof. For instance the polymers may be used in combination with one or more kinds of compounds selected from the group consisting of phosphoric acids and phosphonic acids and water soluble salts thereof, oxygen scavengers and metal chelating agents. Such topping agents may be added to the system in an amount of from about 1 to 500 ppm. The weight ratio of the polymer to topping agents may vary from 100:1 to 1:5.

Examples of such phosphoric acids include condensed phosphoric acids and water soluble salts thereof. The phosphoric acids include an orthophosphoric acid, a primary phosphoric acid and a secondary phosphoric acid. Condensed phosphoric acids include polyphosphoric acids such as pyrophosphoric acid, tripolyphosphoric acid and the like, metaphosphoric acids such as trimetaphosphoric acid, and tetrametaphosphoric acid.

As to the other phosphonic acid derivatives which are to be added in addition to the polymers of the present invention, there may be mentioned aminopolyphosphonic acids such as aminotrimethylene phosphonic acid, ethylenediaminetetramethylene phosphonic acid and the like, methylene diphosphonic acid, hydroxyethylidene diphosphonic acid, 2-phosphonobutane 1,2,4-tricarboxylic acid, etc. The polymers may be used in combination with yet other topping agents including corrosion inhibitors for iron, steel, copper, copper alloys or other metals, conventional scale and contamination inhibitors, metal chelating agents and other conventional water treatment agents. Other corrosion inhibitors comprise tungstate, nitrites, borates, silicates, oxycarboxylic acids, catechols, and aliphatic amino surface active agents. Other scale and contamination inhibitors include lignin derivatives, tannic acids, starch, polyacrylic soda, polyacrylic amide, etc. Metal chelating agents include polyamines, such as ethylenediamine, diethylenetriamine and the like and polyaminocarboxylic acids, such as nitrilotriacetic (NTA), ethylene diaminetetraacetic acid (EDTA), diethylenetriamine pentaacetic acid, hydroxyethylethylenediaminetriacetic acid (HEDTA), and salt forms of the acids mentioned.

The present polymers can also be used along with chemicals that are capable of reducing dissolved oxygen in boiler water systems. The chemicals referred to as oxygen scavengers, comprise: hydrazine, sulfite, bisulfite, hydroquinone, carbohydrazide, alkyl hydroxylamines, and alkylamine, citric acid, ascorbic acid and its analogs or salt forms, etc. Amines such as morpholine, cyclohexylamine, piperazine, ammonia, various alkylhydroxylamines such as diethylaminoethanol, dimethylisopropanolamine, and diethylhydroxylamine, etc. may be used with the polymers of the invention in steam generating systems.

The water soluble polymers may be added separately to the aqueous system or may be blended with the above topping agents compounds and then added in the state of aqueous solution into the water system either continuously or intermittently.

EXAMPLES

The invention will be further described with reference to a number of specific examples which are to be regarded solely as illustrative, and not as restricting the scope of the invention.

Example 1

Preparation of Methacrylic Acid/Polyethyleneglycol Monomethacrylate(HEM-10) Copolymer Molar Ratio 7.2/1.

A suitable flask was equipped with a condenser, addition funnel, mechanical stirrer, thermometer and a nitrogen sparger. A mixed monomer solution containing 47.64 g of methacrylic acid (0.554 mol) and 48.7 g of HEM-10 (0768 mol, 83%) was placed in the additional funnel. 130.0 g of deionized water and 8.0 g of sodium persulfate were charged to the flask. This solution was sparged with nitrogen for 20 minutes then heated to 85° C. maintaining the nitrogen sparge. The mixed monomer solution was then added to the flask over a period of 75 minutes. One hour after this addition was complete an additional 3 cc of a 9% persulfate solution was added to the reaction mixture. The resulting mixture was heated for two more hours at 85° C. then cooled to room temperature. Caustic (50%) was then added to the solution to adjust the pH to 5.5.

The polymer solution, after being diluted to 30% solids had a Brookfield viscosity of 261 cps at 25° C. The structure of the copolymer was verified by 13C NMR. The spectrum was characterized by a broad poly (methacrylic acid)-type backbone, strong resonances at 60, 69 and 71 ppm corresponding to the polyethyleneglycol moiety and a broad carbonyl region (177–183 ppm). There was no sign of residual monomer.

Examples 2–7

Similar procedures were used to prepare various copolymers of methacrylic acid/polyethyleneglycol monomethacrylate with different mole ratios and degree of ethoxylation, n. The results are shown in Table I.

Example 8

Homopolymer of Polyethyleneglycol Monomethacrylate (HEM-5)

Utilizing the apparatus as described in Example 1, 30.0 g of deionized water, 30.0 g of isopropanol and 2.2 g of sodium persulfate were charged to the flask. 60.0 g of HEM-5 and 12.0 g of a 16.6% sodium persulfate solution were added to the reaction mixture over 150 minutes (80C). The reaction product was heated for one more hour followed by azeotropic removal of isopropanol/water. The reaction mixture was then cooled to room temperature and adjusted to the proper pH with 50% sodium hydroxide.

The homopolymer, after being diluted to 30% solids had a Brookfield viscosity of 40.9 cps at 25° C. The polymer was characterized by 13C NMR which showed the broad polymethacrylate type backbone, sharp resonances at 60, 69 and 70 ppm from the polyethylene glycol moiety and broad but well defined carbonyl resonances at 178 and 179 ppm. There was no sign of residual monomer.

Example 9

Homopolymer of Polyethyleneglycol Monomethacrylate (HEM-10)

Utilizing the apparatus and procedure as described in Example 8, homopolymer of HEM-10 was prepared. The homopolymer, after being diluted to 30% solids has a Brookfield viscosity of 36.8 cps at 25° C. The structure of the homopolymer was confirmed by C13 NMR.

Table 1 summarizes the structure and physical properties of the polymers employed in the examples.

Commercial polymers A, B and C are used as standards for comparison. The molecular weight is obtained by a standard GPC analysis.

TABLE I

| Polymer | Polymer Composition | Co-polymer Ratio | % Solids | Brookfield Visc. (cp.) | Mol. Wt. (GPC) Mn |
|---|---|---|---|---|---|
| 1 | MAA/HEM 10 | 7.2/1 | 31.0 | 179 | 4300 |
| 2 | MAA/HEM 10 | 3.6/1 | 30.1 | 261 | 5800 |
| 3 | MAA/HEM 5 | 6/1 | 29.9 | 153 | 4000 |
| 4 | MAA/HEM 10 | 2.4/1 | 30.4 | 127.5 | 6000 |
| 5 | MAA/HEM 10 | 2.4/1 | 29.8 | 255.5 | 5900 |
| 6 | MAA/HEM 10 | 2.4/1 | 29.6 | 48.8 | 4900 |
| 7 | MAA/HEM 10 | 2.4/1 | 30.1 | 79.1 | 4700 |
| 8 | HEM 5 | | 32.2 | 40.9 | 2700 |
| 9 | HEM 10 | | 30.3 | 36.8 | 4600 |
| A | PMAA | | 30.0 | | 8000 |
| B | AA/AM | 2.4/1 | 26.4 | | |
| C | PAA | | 50.0 | | 3000 |

MAA = methacrylic acid
PMAA = polymethacrylic acid, sodium salt
PAA = polyacrylic acid, sodium salt
HEM 10 = Polyethyleneglycol monomethacrylate, having an average of 10 moles of ethylene oxide
HEM 5 = Polyethyleneglycol monomethacrylate, having an average of 5 moles of ethylene oxide
AA/AM = commercial acrylic acid/acrylamide copolymer
All GPC results are based on polyacrylic acid standards
HEM 5 & 10 are sold by Rhone-Poulenc under the tradename Sipomer ®

CHELATION VALUES

Chelation values obtained in this invention are used as a tool to measure a polymer's ability to sequester ions at lower temperatures. These measurements are determined by bench top analysis. The method is similar to that disclosed in U.S. Pat. No. 4,457,847.

The system for determining chelation values consisted of the following equipment:

1) An Orion model 701A digital pH/mV meter with an Orion model 93-20 Ca(2+) ion specific electrode and a Ag/AgCl reference electrode.
2) A Markson model 41064 pH meter (battery operated to avoid ground loops) using a Markson pH electrode model 13-620-108.

A calcium calibration curve is established each day. It is prepared with standard solutions of 1, 10, 100, and 1000 ppm Ca(as CaCO$_3$). The electrode potentials (mV) is plotted vs log [Ca] as CaCO$_3$. Only the 10, 100, and 1000 ppm potentials are used for the plot because the lower concentration shows notable deviation from linearity.

The test consists of titrating increments of a known concentration of sequestrant into a known concentration of Ca (as CaCO$_3$) and plotting the mg Ca (as CaCO$_3$) sequestered vs the grams of active sequestrant. The initial slope of the best fitting line which goes through the origin is the chelation value.

Solutions of sequestrant are made using 0.5 grams of active sequestrant per 250 mls. All solutions are prepared so as to maintain constant ionic strength and pH throughout the tests; including the standards and titrating solutions. Ionic strength is fixed using 1 ml of 4M KCL per 50 mls of solution. The pH of the sequestrant titrating solutions is brought to 10.0 with 1.0M KOH. During the calibration and titration, the pH was maintained at 10 with 0.1M KOH. A 100 ppm Ca (as CaCO$_3$)

standard solution is used as the test solution for all titrations.

By this methodology, calcium chelation values for the new polymers of this invention were measured. Table II lists these results along with several current boiler treatment polymers as cited in U.S. Pat. No. 4,457,847. The values in this test are substantially lower than the prescribed minimum for acceptable boiler treatment chemicals. The new boiler treatment polymers do not have chelation values above the 200 threshold level, and many are substantially below this.

TABLE II

| Calcium Chelation Values | |
|---|---|
| Compound | Chelation Value |
| EDTA | 328 |
| Polymer A | 356 |
| Polymer B | 306 |
| Polymer C | 351 |
| Example 1 | 191 |
| Example 2 | 137 |
| Example 3 | 166 |
| Example 4 | 98 |
| Example 5 | 57 |
| Example 6 | 83 |
| Example 7 | 92 |
| Example 8 | <10 |
| Example 9 | <10 |

EDTA = Ethylenediaminetetraacetic acid

The chelation value does not change substantially after the polymer is heat treated at typical boiler pressures of 600 psig for up to 6 hours (Table III). A 2 hour residence time exceeds the residence time in a feedwater train but does not approach the residence time of a typical drum boiler. The 6 hour residence time approaches that of the Research Boiler used in this test. The chelation value of the new polymer remains low at these two extreme conditions, an indication that the polymer has negligible corrosive tendencies in a boiler or boiler feedwater system.

TABLE III

| Calcium Chelation Values of Polymer 8 (Heat Treated at 600 psig in 10 ppm Phosphate) | |
|---|---|
| Time | Chelation Value |
| 0 Hrs | <10 |
| 2 Hrs | 23 |
| 6 Hrs | 26 |

The characteristics described above show how these polymers of the present invention are novel and a substantial improvement over currently used boiler polymers. The following boiler studies further provide evidence of how these polymers provide superior performance in both a low to medium pressure all polymer chelant program, a chelant/polymer program and a medium to high pressure coordinated PO4/pH program.

BOILER STUDIES

In order to assess the efficacy of the polymers of the present invention in inhibiting scale formation in steam generating systems, research boilers were fitted with two 4,000 watt electrical heater probes, giving 185,000 BTU/ft$^2$/hr and about 8 Kg/hr steam. The boiler feedwater contained the contaminants and treatment agents given herein below. The boilers were operated for 44 hours per run at an average of 15 cycles of concentration. At the conclusion of each run, the deposits were cleaned from the probes with an acid solution and the deposit densities were then calculated based on the known probe surface areas.

During the 44 hour runs, daily blowdown (BD) samples are submitted for calcium, magnesium, and/or iron analysis. The average of daily analysis are used to monitor transport of each contaminate (in ppm) out of the boiler.

TABLE IV

Polymer Performance in an "All Polymer" Program
Conditions: 600 psig
4:1:1 Ca:Mg:Fe (ppm)
Polymer actives/hardness 1/1
hydroquinone as oxygen scavenger

| Polymer | Ave. Deposit g/ft$^2$ | BD Ca (Ave. ppm) | BD Mg (Ave. ppm) | BD Fe (Ave. ppm) |
|---|---|---|---|---|
| Example 1* | 0.193 | 24.3 | 1.4 | 0.6 |
| Example 2* | 0.217 | 26.0 | 3.3 | 2.1 |
| Example 3* | 0.285 | 30.6 | 5.8 | 2.2 |
| Example 4 | 0.251 | 24.5 | 1.3 | 0.33 |
| Example 5 | 0.204 | 27.7 | 3.3 | 2.4 |
| Example 6 | 0.221 | 30.3 | 8.1 | 3.6 |
| Example 7 | 0.196 | 21.8 | 0.8 | 0.4 |
| Example 8 | 0.181 | 15.8 | 2.5 | 1.8 |
| Example 8 | 0.124 | 20.4 | 7.8 | 3.7 |
| Example 9 | 0.179 | 13.5 | 1.2 | 0.9 |
| Example 9 | 0.081 | 10.3 | 3.3 | 3.1 |
| Polymer A | 0.297 | 28.2 | 4.3 | 1.4 |
| Polymer B | 2.824 | 5.0 | 1.6 | 0.6 |
| Polymer C | 4.245 | 4.8 | 1.7 | 0.3 |
| Blank | 1.166 | 2.8 | 0.8 | 0.1 |

BD = boiler blowdown
*addition of antifoam UCON ® 5100

Table IV shows the effectiveness of these polymers and copolymers in reducing deposition on the heat transfer surfaces of the Research Boilers in an all polymer treatment program. The blank run in this table shows substantial deposition of calcium, magnesium and iron on the surfaces. In addition to heavy deposition, the blank run shows no evidence of transport of contaminates by boiler blowdown. The blowdown numbers are notably lower than any of the systems with a treatment additive and indicate a need for a boiler treatment program.

Comparative polymers B and C show higher deposit weights than the blank. This increase is due to calcium deposition.

The polymers of the invention listed in Table IV show better performance than the commercial polymers currently used for boiler treatment. The lower deposits are reflected by a notable increase in the transport of the contaminates.

TABLE V

Polymer Performance in a Coordinated PO4/pH Program
Conditions: 1450 psig
2.5 ppm Fe feed
20 ppm Ortho - PO4
pH 9.75 - 10.00
Hydrazine as oxygen scavenger

| Treatment | Ave. Deposit (g/ft$^2$) | BD Fe (ppm, Day 1) | BD Fe (ppm, Day 2) |
|---|---|---|---|
| Blank | 2.109 | 0.47 | 0.19 |
|  | 2.377 | 0.71 | 1.16 |
| 10 ppm Polymer A | 0.963 | 0.50 | 0.16 |
|  | 0.638 | 0.11 |  |
| 20 ppm Polymer A | 0.729 | 0.24 | 0.50 |
|  | 0.599 | 0.09 | 0.28 |
| 10 ppm Example 6 | 0.462 | 1.38 | 0.95 |
| 10 ppm Example 7 | 0.511 | 0.30 | 0.51 |
| 10 ppm Example 8 | 0.286 | 0.48 | 0.48 |

TABLE V-continued

Polymer Performance in a Coordinated PO4/pH Program
Conditions: 1450 psig
2.5 ppm Fe feed
20 ppm Ortho - PO4
pH 9.75 - 10.00
Hydrazine as oxygen scavenger

| Treatment | Ave. Deposit (g/ft$^2$) | BD Fe (ppm, Day 1) | BD Fe (ppm, Day 2) |
|---|---|---|---|
| 10 ppm Example 9 | 0.567 | 0.50 | 0.39 |

Polymer A: polymethacrylic acid, sodium salt

Table V lists results for the evaluation of these polymers in a coordinated PO4/pH program with high iron contaminate concentrations. This test methodology is typical of a higher pressure boiler system with a demineralized pretreatment program, and is very different from the previous test system. Test polymers were fed as 10 ppm PMAA, where the concentration fed was determined using the ratio of equivalent weights of PMAA to the test polymer.

The results in Table V show that these new polymers are superior to polymethacrylic acid and a commonly used polymer for boiler water treatment.

TABLE VI

Polymer Performance in a Chelant/Polymer
Research Boiler Program
600 p.s.i.g.
4:1:1 Ca:Mg:Fe (ppm)
Chelant fed at 0.5:1 stoichiometry
Hydroquinone as oxygen scavenger

| Treatment | Ave. Deposit (g/ft$^2$) | BD Fe (ppm Ave.) | BD Ca (ppm. ave.) | BD Mg (ppm. ave.) |
|---|---|---|---|---|
| Blank | 2.873 | 0.07 | 8.40 | 0.81 |
| Polymer A | 0.270 | 3.95 | 23.60 | 6.65 |
| Example 4 | 0.196 | 0.10 | 18.15 | 1.06 |

Chelant: EDTA

The results listed in Table VI show the performance of the Example 3 polymer of the invention as compared to polymethacrylic acid in the chelant/polymer program.

The Research Boiler data shows that the polymers of the invention are effective at reducing deposition and increasing transport hardness in three substantially different boiler programs. In addition, these polymers show no potential of being corrosive in the feedwater train as indicated by their chelation values and are a substantial improvement over the deleterious effects encountered with currently practiced technology. In addition to the effectiveness of these polymers in boiler treatment programs, the polymers contain much lower concentrations of sodium, thus resulting in less dissolved solids in the boiler. All these traits make the polymers of the invention a novel contribution to boiler water treatment.

What we claim is:

1. A composition comprised of (a) a water soluble polymer having the structure

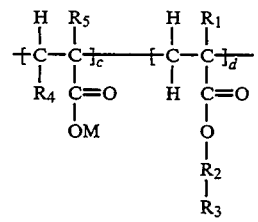

wherein $R_1$ is H or lower ($C_1$-$C_4$) alkyl, $R_2$ is $(CH_2\text{-}CH_2\text{-}O)_n$,

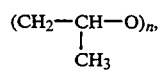

or a mixture of both, n is an integer of from about 1 to about 40, $R_3$ is H, lower ($C_1$-$C_4$) alkyl or an acetate, $R_4$ is H or COOM, $R_5$ is H or lower ($C_1$-$C_4$) alkyl and M is H or a water soluble cation, c is from 0-95 molar percent, d is from 100-5 molar percent with the proviso that c and d add up to 100 percent and (b) at least one topping agent selected from the group consisting of chelating agents and oxygen scavengers, wherein the chelating agents are selected from the group consisting of ethylenediamine and diethylenetriamine and wherein the oxygen scavenger is selected from the group consisting of hydrazine, sulfite, bisulfite, hydroquinone carbohydrazide, alkylhydroxylamines, alkylamine, ascorbic acid and its analogs or salt forms thereof.

2. The composition of claim 1 wherein the weight ratio of polymer: topping agent is from 100:1 to 1:5, respectively.

3. The composition of claim 1 wherein $R_4$ is H, $R_5$ is $CH_3$ and M is H or a water soluble cation.

* * * * *